United States Patent
Stokes, III et al.

(10) Patent No.: US 12,182,258 B2
(45) Date of Patent: Dec. 31, 2024

(54) ADVERSARIAL TRAINING TO MINIMIZE DATA POISONING ATTACKS

(71) Applicant: MICROSOFT TECHNOLOGY LICENSING, LLC, Redmond, WA (US)

(72) Inventors: Jack Wilson Stokes, III, North Bend, WA (US); Emre Mehmet Kiciman, Seattle, WA (US); Manoj Ajith Prasad, Redmond, WA (US); Andrew Thomas Marshall, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 343 days.

(21) Appl. No.: 17/710,973

(22) Filed: Mar. 31, 2022

(65) Prior Publication Data
US 2023/0148116 A1    May 11, 2023

Related U.S. Application Data

(60) Provisional application No. 63/277,140, filed on Nov. 8, 2021.

(51) Int. Cl.
*G06F 21/55* (2013.01)
*G06N 5/022* (2023.01)

(52) U.S. Cl.
CPC .......... *G06F 21/552* (2013.01); *G06N 5/022* (2013.01); *G06F 2221/03* (2013.01)

(58) Field of Classification Search
CPC .... G06F 21/552; G06F 2221/03; G06N 5/022
See application file for complete search history.

(56) References Cited

U.S. PATENT DOCUMENTS 11,416,754 B1 *   8/2022   Durvasula ................ G06N 3/08
11,494,496 B2 * 11/2022   Grosse .................. G06F 21/577
(Continued)

OTHER PUBLICATIONS

Veldanda et al., NNoculation: Broad Spectrum and Targeted Treatment of Backdoored DNNs (Year: 2020).*
(Continued)

*Primary Examiner* — Samson B Lemma
*Assistant Examiner* — Richard W Cruz-Franqui
(74) *Attorney, Agent, or Firm* — Newport IP, LLC; Jacob P. Rohwer

(57) ABSTRACT

The techniques disclosed herein enable systems to train machine learning models using benign augmentation to enabled resistance various data poisoning attacks. This is achieved by first training a machine learning model using an initial dataset that is trustworthy and originates from a known source. The initial dataset is then modified to include known attack triggers such as syntactic paraphrasing to generate an augmented dataset. The augmented dataset is then used to train a robust machine learning model based using the initially trained machine learning model. The resultant robust machine learning model is then enabled to detect and resist attacks captured by the augmented dataset. The robust machine learning model can be retrained using an untrusted dataset that includes various compromised inputs in conjunction with the augmented dataset. Retraining results in an updated robust machine learning model that can learn and resist various data poisoning attacks on the fly.

20 Claims, 10 Drawing Sheets

(56) References Cited

U.S. PATENT DOCUMENTS

| | | | | |
|---|---|---|---|---|
| 2009/0299925 | A1* | 12/2009 | Ramaswamy | G06F 21/316 706/12 |
| 2019/0318099 | A1* | 10/2019 | Carvalho | G06F 21/577 |
| 2020/0097597 | A1* | 3/2020 | Lourentzou | G06N 5/022 |
| 2021/0081708 | A1* | 3/2021 | Angel | G06N 3/08 |
| 2021/0081718 | A1* | 3/2021 | Angel | G06F 18/24 |
| 2021/0081831 | A1* | 3/2021 | Angel | G06N 20/00 |
| 2021/0089941 | A1* | 3/2021 | Chen | G06N 5/04 |
| 2021/0256125 | A1* | 8/2021 | Miller | G06F 21/566 |
| 2021/0303695 | A1* | 9/2021 | Grosse | G06N 3/08 |
| 2022/0398325 | A1* | 12/2022 | Nguyen | G06F 21/554 |
| 2023/0130705 | A1* | 4/2023 | Sesha | H04L 61/4511 726/23 |
| 2023/0148116 | A1* | 5/2023 | Stokes, III | G06F 21/552 726/23 |
| 2023/0409715 | A1* | 12/2023 | Nissim | G06F 9/45533 |
| 2024/0054233 | A1* | 2/2024 | Ohayon | G06F 21/577 |

OTHER PUBLICATIONS

C. Fan et al., Defending Against Backdoor Attacks in Natural Language Generation (Year: 2021).*

NPL Search History (Year: 2024).*

"International Search Report and Written Opinion Issued in PCT Application No. PCT/US22/046205", Mailed Date: Feb. 3, 2023, 12 Pages.

Veldanda, et al., "NNoculation: Broad Spectrum and Targeted Treatment of Backdoored DNNs", In Repository of arXiv:2002.08313v1, Feb. 19, 2020, 17 Pages.

Chen, et al., "BadNL: Backdoor Attacks Against NLP Models", In repository of arXiv:2006.01043v1, Jun. 1, 2020, 8 Pages.

Chen, et al., "Targeted Backdoor Attacks on Deep Learning Systems Using Data Poisoning", In repository of arXiv:1712.05526v1, Dec. 15, 2017, pp. 1-18.

Dai, et al., "A Backdoor Attack Against LSTM-Based Text Classification Systems", In Journal of IEEE Access, vol. 7, Sep. 13, 2019, pp. 138872-138878.

Devlin, "BERT: Pre-training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Fan, et al., "Defending against Backdoor Attacks in Natural Language Generation", In repository of arXiv:2106.01810v1, Jun. 3, 2021, pp. 1-14.

Gao, et al., "STRIP: A Defence Against Trojan Attacks on Deep Neural Networks", In Proceedings of the 35th Annual Computer Security Applications Conference, Dec. 9, 2019, pp. 113-125.

Gu, et al., "BadNets: Identifying Vulnerabilities in the Machine Learning Model Supply Chain", In repository of arXiv: 1708.06733v1, Aug. 22, 2017, 13 Pages.

Iyyer, et al., "Adversarial Example Generation with Syntactically Controlled Paraphrase Networks", In Proceedings of the 2018 Conference of the North American Chapter of the Association for Computational Linguistics: Human Language Technologies, vol. 1 (Long Papers), Jun. 1, 2018, pp. 1875-1885.

Kingma, et al., "Adam: A Method for Stochastic Optimization", In Proceedings of 3rd International Conference on Learning Representations, May 7, 2015, pp. 1-15.

Kiourti, et al., "Online Defense of Trojaned Models using Misattributions", In repository of arXiv:2103.15918v1, Mar. 29, 2021, pp. 1-23.

Kurita, et al., "Weight Poisoning Attacks on Pre-trained Models", In repository of arXiv:2004.06660v1, Apr. 14, 2020, 13 Pages.

Liu, et al., "Reflection Backdoor: A Natural Backdoor Attack on Deep Neural Networks", In Proceedings of European Conference on Computer Vision, Aug. 23, 2020, 21 Pages.

Liu, et al., "Trojaning Attack on Neural Networks", In Proceedings of the 25th Annual Network and Distributed System Security Symposium, Feb. 18, 2018, 15 Pages.

Maas, et al., "Learning Word Vectors for Sentiment Analysis", In Proceedings of the 49th Annual Meeting of the Association for Computational Linguistics: Human Language Technologies, Jun. 19, 2011, pp. 142-150.

Qi, et al., "Hidden Killer: Invisible Textual Backdoor Attacks with Syntactic Trigger", In repository of arXiv:2105.12400v1, May 26, 2021, 11 Pages.

Qi, et al., "Onion: A Simple and Effective Defense Against Textual Backdoor Attacks", In repository of arXiv:2011.10369v1, Nov. 20, 2020, 4 Pages.

Qi, et al., "Turn the Combination Lock: Learnable Textual Backdoor Attacks via Word Substitution", In repository of arXiv:2106.06361v1, Jun. 11, 2021, 11 Pages.

Salem, et al., "Dynamic Backdoor Attacks Against Machine Learning Models", In repository of arXiv:2003.03675v1, Mar. 7, 2020, pp. 1-14.

Socher, et al., "Recursive Deep Models for Semantic Compositionality Over a Sentiment Treebank", In Proceedings of the Conference on Empirical Methods in Natural Language Processing, Oct. 18, 2013, pp. 1631-1642.

Stokes, et al., "Preventing Machine Learning Poisoning Attacks Using Authentication and Provenance", In repository of arXiv:2105.10051v1, May 20, 2021, 9 Pages.

Wang, et al., "Practical Detection of Trojan Neural Networks: Data-Limited and Data-Free Cases", In Proceedings of European Conference on Computer Vision, Aug. 23, 2020, 17 Pages.

Wolf, et al., "Transformers: State-of-the-Art Natural Language Processing", In Proceedings of the Conference on Empirical Methods in Natural Language Processing: System Demonstrations, Nov. 16, 2020, pp. 38-45.

* cited by examiner

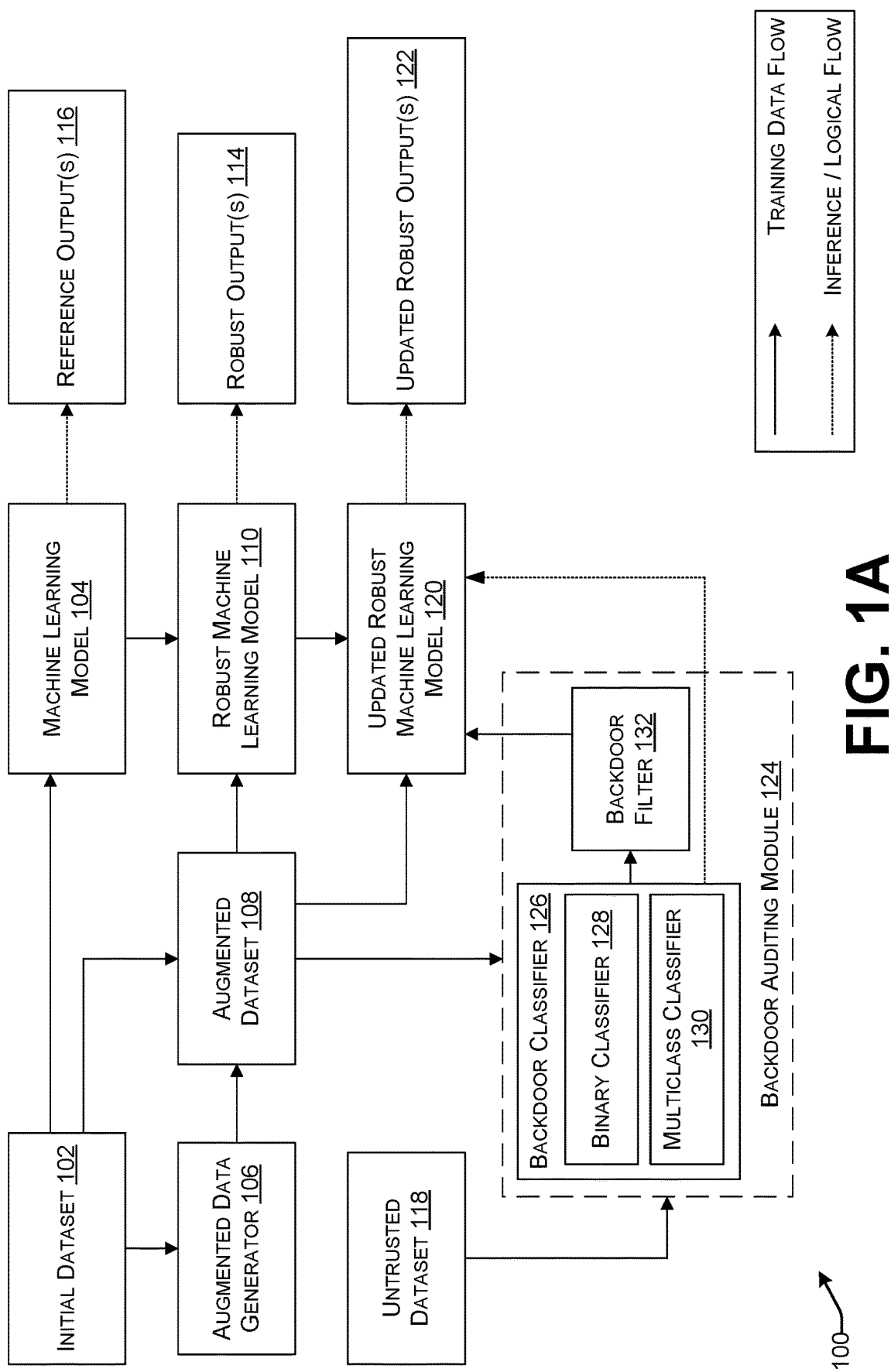

ADVERSARIAL TRAINING TO MINIMIZE DATA POISONING ATTACKS

CROSS REFERENCE TO RELATED CASES

This application claims the benefit of U.S. Patent Application No. 63/277,140 filed on Nov. 8, 2021, entitled: ADVERSARIAL TRAINING TO MINIMIZE DATA POISONING ATTACKS, the subject matter of which is hereby incorporated by reference in its entirety.

BACKGROUND

Recent research has proposed a number of data poisoning attacks which seek to modify a dataset's labels to train a classifier to wrongly predict the class for a subset of the inputs. While adversarial attacks are attempted during inference using a previously trained classifier, a data poisoning attack is instead conducted before or during training the classifier by modifying labels in the training set and possibly the validation set. Like adversarial attacks, a data poisoning attack can be targeted or non-targeted. For the targeted attacks, the adversary's goal is to have the classifier wrongly predict an input to belong to a specific class instead of the true class, while the classifier is trained to incorrectly predict any class instead of the true class in a non-targeted attack. A common goal of some targeted data poisoning attacks is to introduce a backdoor into the final classifier which wrongly predicts the class for a very small subset of examples that are typically known only to the attacker. For example, a backdoor introduced into a face recognition system could allow someone to log on as someone else in computer or mobile device.

Researchers have previously proposed two main approaches to preventing or minimizing backdoor attacks, authentication and provenance-based solutions and machine learning-based detection. In the first approach, a training system that uses an authentication and provenance-based solution, the dataset creator can generate metadata that includes hashes for the original dataset. These hashes can cryptographically bind the metadata to the feature data and the associated labels that are used to train a classifier. If the attacker changes one or more labels, or feature data, in the training and validation datasets, the cryptographic hashes stored in the metadata will not match the dataset's contents. As a result, the model trainer can detect that the training data has been modified.

In the second approach, data poisoning detection algorithms are proposed which are considered to be online or offline methods. Online detection algorithms attempt to identify examples in the training set which are anomalous compared to the underlying distribution. Offline detection methods instead try to detect models which have been trained with poisoned data. However, these approaches as well as other previous work on data poisoning attacks and defenses are focused largely on the context of image-based attacks. As such, very few existing solutions consider the possibility of text-based data poisoning attacks. In some examples, text-based attack methods can prove less detectable than image-based attacks thereby posing a greater threat to system security. Thus, there is a need for systems to enhance security of machine learning models in the face of text-based data poisoning attacks.

It is with respect to these and other considerations that the disclosure made herein is presented.

SUMMARY

The techniques disclosed herein bolster the security of machine learning models and systems through the introduction of adversarial training with examples generated from previously detected adversarial attacks. Generally described, a machine learning model is trained using an initial dataset that is known to be free of compromises. The initial dataset can then be modified to create an augmented dataset that is based on known types of data poisoning attacks. Using the augmented dataset to further train the machine learning model, a robust machine learning model can be generated that is resilient to the attacks included in the augmented dataset. Furthermore, the robust machine learning model can be deployed in a live context (e.g., at a datacenter) to enhance overall system security.

During live operations, the system may receive an untrusted dataset from an unknown source. Stated another way, the untrusted dataset can be received from users of the datacenter or other network traffic that originates from outside the system. The untrusted dataset can be used in conjunction with the augmented dataset to further train the robust machine learning model. As will be elaborated upon below, the untrusted dataset can be processed by a backdoor auditing module to enable effective training of the robust machine learning model.

In this way, the classifier can continually learn to better classify examples of data poisoning attacks. By leveraging adversarial training to minimize the efficacy of adversarial examples against previously trained models, the disclosed techniques can greatly bolster the security of critical systems. In addition, many cloud-based, machine-learning services often host classifiers for natural language processing tasks with textual input such as sentiment detection. As such, the disclosed techniques can be implemented using existing infrastructure with minimal impact on system performance.

In another example of the technical benefit of the present disclosure, by utilizing the untrusted dataset to continually retrain the robust machine learning model, the system can uncover new forms of data poisoning or backdoor attacks. This differs from existing approaches which rely on a limited set of invisible textual patterns known to the public. As such, typical solutions contradict the secrecy of backdoor triggers and can thus be rendered useless as attackers develop new backdoor triggers. In contrast by utilizing benign backdoor augmentation to leverage the public knowledge of invisible textual patterns the disclosed system can mitigate invisible textual backdoor attacks.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The Detailed Description is described with reference to the accompanying figure.

FIG. 1A is a block diagram of a system for training a machine learning model to resist various adversarial attacks and for performing dataset auditing to detect compromised data.

DETAILED DESCRIPTION

Figure 1B:
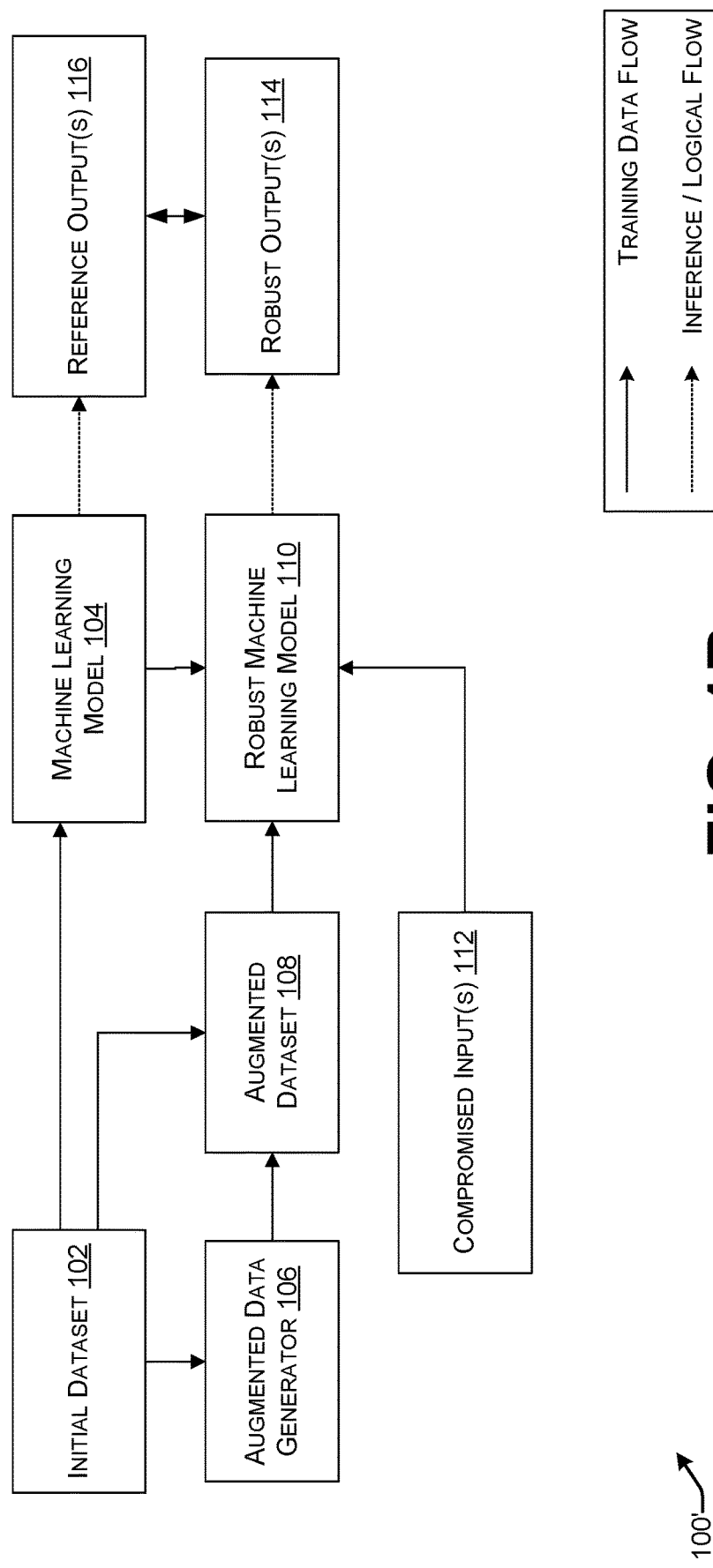
FIG. 1B illustrates the machine learning model training system in a first phase of operation.

Recently, backdoor attacks have attracted considerable attention because of their low detectability and advanced threat to the security of machine learning models such as deep neural networks. Many existing backdoor attacks focus on the field of computer vision, such as static triggers and dynamic triggers embedded within an image. In response to these attacks, many organizations have developed various defense approaches, such as input data inspection trigger extraction, and model diagnoses. These defenses then motivate attackers to search for invisible triggers, so the backdoor samples are thus more difficult to identify.

As mentioned above, while many solutions exist for defending against image-based attacks, textual backdoor attacks and defenses are less investigated. Primitive textual backdoor attacks insert uncommon tokens, change the spelling or verb tense, or insert a fixed sentence. However, these attacks are fairly visible due to grammatical errors and thus can be easily detected and removed. For example, some defenses leverage an independent language model to conduct word-level inspections and remove potential trigger words.

Similar to invisible backdoors in computer vision, attackers may utilize invisible backdoors in the context of text-based natural language processing. Invisible textual backdoor attacks aim to search for natural and fluent triggers without grammatical errors; such triggers differ from benign samples in the latent space. For example, the syntactic structure and combination of synonym words are effectively invisible textual triggers. These attacks either paraphrase the sentence with a fixed syntactic template or replace words with learning-based or rule-based synonyms. As a result, these attacks can be resistant to existing defenses.

However, many invisible backdoor attacks may share the same limitation in the text domain as in image-based attacks. While it can be straightforward to find a secret and invisible trigger in the image domain, such as random noise, invisible triggers in the text domain may be limited and largely known to the public. For example, a syntactic trigger may choose from a limited set of uncommon syntactic templates to achieve satisfactory attack performance. Subsequently, defense systems can exploit this limitation to mitigate invisible textual backdoor attacks.

Various examples, scenarios, and aspects that enable quality aware machine learning in autonomous platforms, are described below with reference to FIGS. 1 through 7.

In the present disclosure, a benign backdoor augmentation defense system is shown and described to enhance the security of machine learning models. An overview of this defense is shown in the system 100 of FIG. 1A. In various examples, backdoor attacks can be carried out based on the training data poisoning scenario, where the attacker poisons a dataset with backdoor samples. The poisoned dataset is then used to train a machine learning model which is compromised as a result. At the same time, the defender (e.g., the model trainer) aims to continuously fine-tune the existing model on new and/or untrusted data while mitigating the effect of potential backdoor samples, as shown in FIG. 1A.

Turning to FIG. 1B, a first phase of operation for the data poisoning defense system is shown and described in a system 100'. In various examples, an administrative entity such as a system engineer can utilize an initial dataset 102 to train a machine learning model 104. In various examples, the initial dataset 102 can include curated data that originates from a known source and is trusted by the administrative entity to be free of compromises. In addition, the inputs within the initial dataset 102 can include a label that is output when the input is processed by the machine learning model 104. The authenticity of the initial dataset 102 can be ensured using various methods such as cryptographic authentication.

To defend against invisible backdoor attacks, the administrative entity can leverage existing or known attacks to define an augmented data generator 106, which generates an augmented dataset 108 based on the initial dataset 102. As will be elaborated upon below, the augmented dataset 108 can be a modified version of the initial dataset 102 that includes various attack triggers. Using the augmented dataset 108, the system can generate a robust machine learning model 110 based on the machine learning model 104. The resulting robust machine learning model 110 can thus be resilient to known types of attacks included in the augmented data set 108. That is, the robust machine learning model 110 can be enabled to detect various attack triggers such as a paraphrasing through a syntactic template, or synonym substitution.

As will be discussed below, the robust machine learning model 110 may receive one or more compromised inputs 112 that can constitute an attack. As mentioned above, a compromised input 112 can include an attack trigger. In response to detecting a compromised input 112, the robust machine learning model 110 can generate robust outputs 114 that alert the administrative entity to an attack. Accordingly, the administrative entity can take appropriate action to address the attack. Alternatively, the robust outputs 114 can automatically activate one or more associated security mechanisms. For instance, a robust output 114 may cause the system to temporarily suspend operations to remove the compromised input 112. In another example, the robust outputs 114 can cause the system to ignore and reject the compromised input 112.

Furthermore, reference outputs 116 can be obtained from the machine learning model 104. As discussed above, the machine learning model 104 may be trained using the only the initial dataset 102. In a non-adversarial setting, the machine learning model 104 can be trusted by the administrative entity to various classification tasks. In addition, the machine learning model 104 can serve as a baseline model for any backdoor attacks and defenses. In various examples, the reference outputs 116 can illustrate nominal system behavior (e.g., when no attack occurs). By comparing the robust outputs 114 to the reference outputs 116, the system can detect unexpected behavior and uncover a previously unknown attack type or approach.

It should be understood that the initial training process of the machine learning model 104 and the robust machine learning model 110 can take place prior to deployment of the robust machine learning model 110 in a live context. That is, the machine learning model 104 and the robust machine learning model 110 may not be exposed to unknown inputs or inputs that originate from outside the system. Stated another way, inputs to the machine learning model 104 and the robust machine learning model 110 such as the initial dataset 102 and the augmented dataset 108 can be tightly controlled by the administrative entity while compromised inputs 112 can be received from unknown sources other than the administrative entity.

Figure 1C:
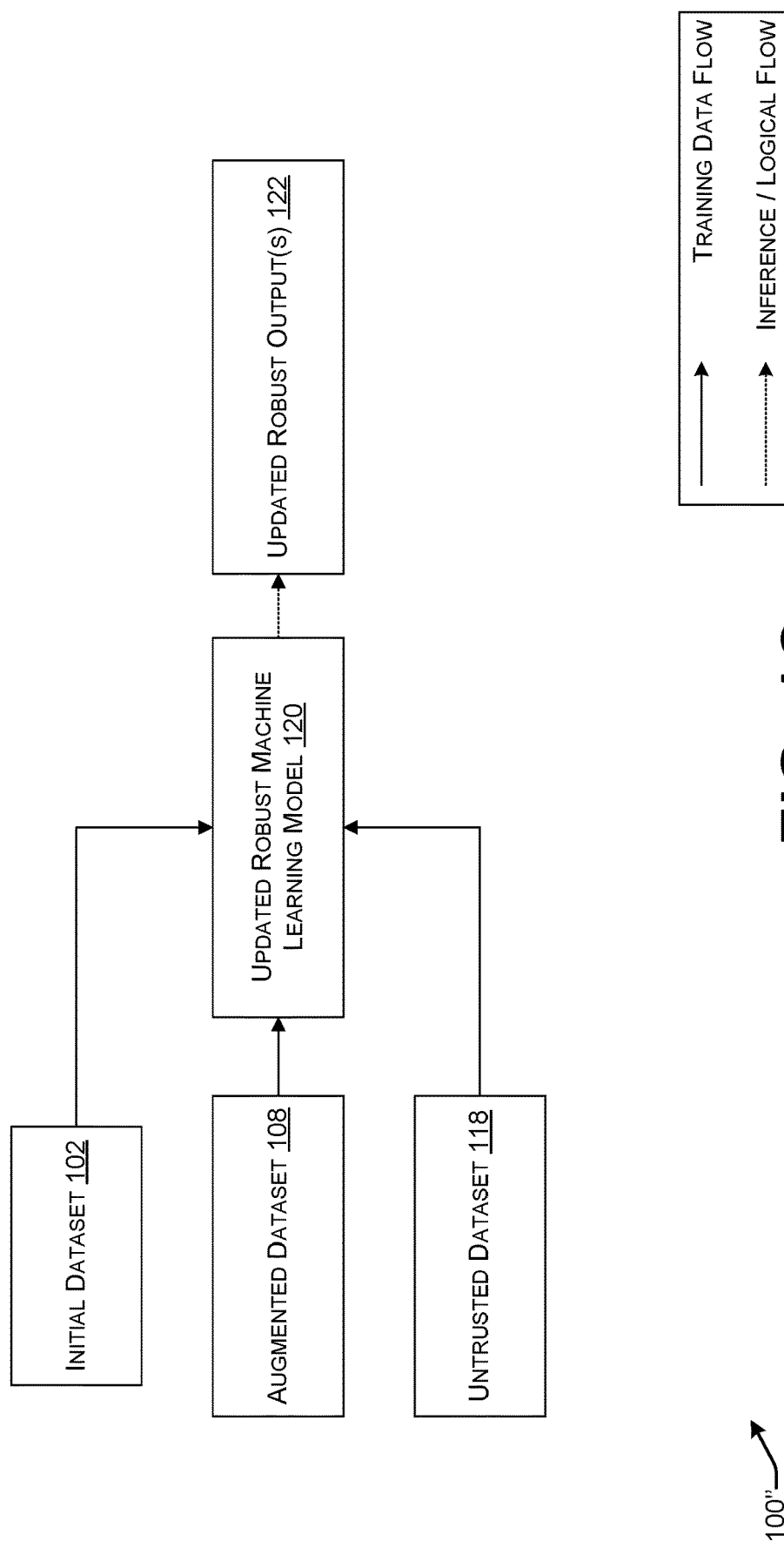
FIG. 1C illustrates the machine learning model training system in a second phase of operation.

Turning now to FIG. 1C, a second phase of operation for the data poisoning defense system is shown and described as a system 100". At a subsequent point in time following the training the of the robust machine learning model 110, continued training of the robust machine learning model 110 using an untrusted dataset 118 can occur. In various examples, the untrusted dataset 118 can be obtained from normal operations at a larger overall system such as a datacenter. For instance, the robust machine learning model 110 may be deployed at a datacenter that provides cloud computing services to many individual users. The system may then receive inputs from the users in the form of text, such as command line inputs, text in a document, and so forth.

In this environment, the source and intent of inputs within the untrusted dataset 118 can be unknown. As such, an attacker can poison the training data by injecting invisible backdoor samples with a chosen target label. In many examples, the goal of the attacker is to cause the robust machine learning model 110 to output the target label when an input contains the backdoor trigger while preserving normal behavior of the robust machine learning model 110 on benign inputs. In this setting, the system can fine-tune the robust model using the initial dataset 102, the augmented dataset 108, and/or the untrusted dataset 118 all together to generate an updated robust machine learning model 120. While the robust machine learning model 110 can be resilient to known attack types captured by the augmented dataset 108, the updated machine learning model 120 can be trained using new approaches discovered during live operations.

In a benign scenario, the machine learning model 104 can be trained on the initial dataset 102 which can be a set of known inputs where each input contains a ground-truth label. In a backdoor attack scenario, the training data can be viewed as the union of a set of clean samples from the initial dataset 102 and a set of backdoor samples from the untrusted dataset 118 having a target label chosen by the attacker. Typically, the attacker's goal can be to compromise the machine learning model 102 to output the label selected by the attacker when the input sample contains the pre-specified backdoor trigger.

Of particular interest is invisible textual backdoor attacks that inject the backdoor trigger to benign inputs for a limited set of invisible textual triggers. Thus, the backdoor sample can be generated with a target label. In many examples, attackers can utilize three major varieties of backdoor attacks, including Syntactic Paraphrasing, Synonym Substitution, and Token Insertion, where syntactic paraphrasing and synonym substitution are invisible attacks and token insertion is a visible attack.

A syntactic paraphrasing trigger can be a particular syntactic template that describes the structure of an input sentence. This attack can inject the trigger by paraphrasing a benign sentence into a given syntactic structure. Therefore, syntactic paraphrasing attacks can be viewed as a paraphrasing function using a syntactic template, with a set of candidate templates chosen by the attacker. Typically, uncommon templates are favored by attackers to obtain satisfactory attack performance as common templates can be easily detected. Since such templates can be limited and publicly known, the set of candidate templates can be considered as a small publicly known set.

A synonym trigger is generated from a mapping from common words or phrases to their uncommon synonyms. This attack injects the trigger by replacing common words in the benign sentence with a pre-specified set of uncommon synonyms. Therefore, synonym substitution attack can be viewed as a word substitution function using a synonym mapping with a set of candidate mappings determined by the attacker. Synonyms can be chosen through a learning-based or rule-based manner. Since the uncommon synonyms of each word of an input can be limited and publicly known, the set of possible synonyms can also be considered as a small publicly known set.

Token triggers can be drawn from a set of uncommon and meaningless tokens. In various examples, a token can be a complete word or simply a string of alphanumeric characters. This attack directly inserts such tokens into the benign sentence. Therefore, token insertion attacks can be viewed as a token insertion function using the pre-specified set of tokens. In this case, however, the set of possible tokens can be infinitely large and secretly held by the attacker.

In various scenarios, a backdoor attack can replace a subset of inputs with the adversarial backdoor inputs each having a target label. However, given the knowledge of various attack methods, the system can leverage a known or existing attack to produce benign backdoor samples having an unchanged ground-truth label. These benign backdoor samples can form the augmented dataset 108. Since existing attacks can be exploited to generate backdoor samples, these attacks can be referred to for their detailed implementation. The exception being that the label is not switched to a target label. Augmented training of the robust machine learning model 110 can be conducted in two stages. First, the robust machine learning model 110 is trained using both the initial dataset 102 and the augmented dataset 108 as shown and described above. Secondly, the robust machine learning model can be retrained using the untrusted data in addition to the initial dataset 102 and/or the augmented dataset 108. Retraining of the robust machine learning model 110 can yield an updated robust machine learning model 120 which can be equipped with a textual classification task that aims to identify invisible backdoor triggers.

Retraining the robust machine learning model 110 to generate the updated robust machine learning model 120 aims to further strengthen the machine learning model 104 against future backdoor attacks. The resulting model, the updated machine learning model 120, can be configured with the knowledge of all existing textual backdoor attacks. In other words, the updated robust machine learning model 120 can return correct outputs even if given compromised inputs 112. In addition, the updated robust machine learning model can defend against backdoor attacks on the fly. It should be understood that while particular a discussion is given to specific types of backdoor attacks, any type of text-based trigger can be discovered and/or learned by the system and the/or the updated robust machine learning model 120.

Various approaches can be taken to retrain the robust machine learning model 110 on the untrusted dataset 118. In a first example, the system can directly re-train the robust machine learning model on the augment dataset 108 and the untrusted dataset 118 as shown in FIG. 1C. In addition, several constraints can be enforced to mitigate the potential harm from the untrusted dataset 118. For example, a higher weight can be assigned to the trusted augmented dataset 108 during the re-training stage. It should be understood that weights can be applied to any other dataset such as the initial dataset 102 or the untrusted dataset 118 to emphasize or deemphasize the influence of the dataset on the updated robust machine learning model 120.

When processing inputs, the updated robust machine learning model 120 can generate updated robust outputs 122. In various examples, the updated robust outputs 122 can be labels associated with the input. In response to detecting a compromised input 112 the updated robust machine learning model 120 can be enabled, through the retraining, to produce a corrected label that is associated with the input instead of the target label. In addition, the updated robust outputs 122, like the robust outputs discussed above can serve to alert an administrative entity and/or activate other security measures.

Figure 1D:
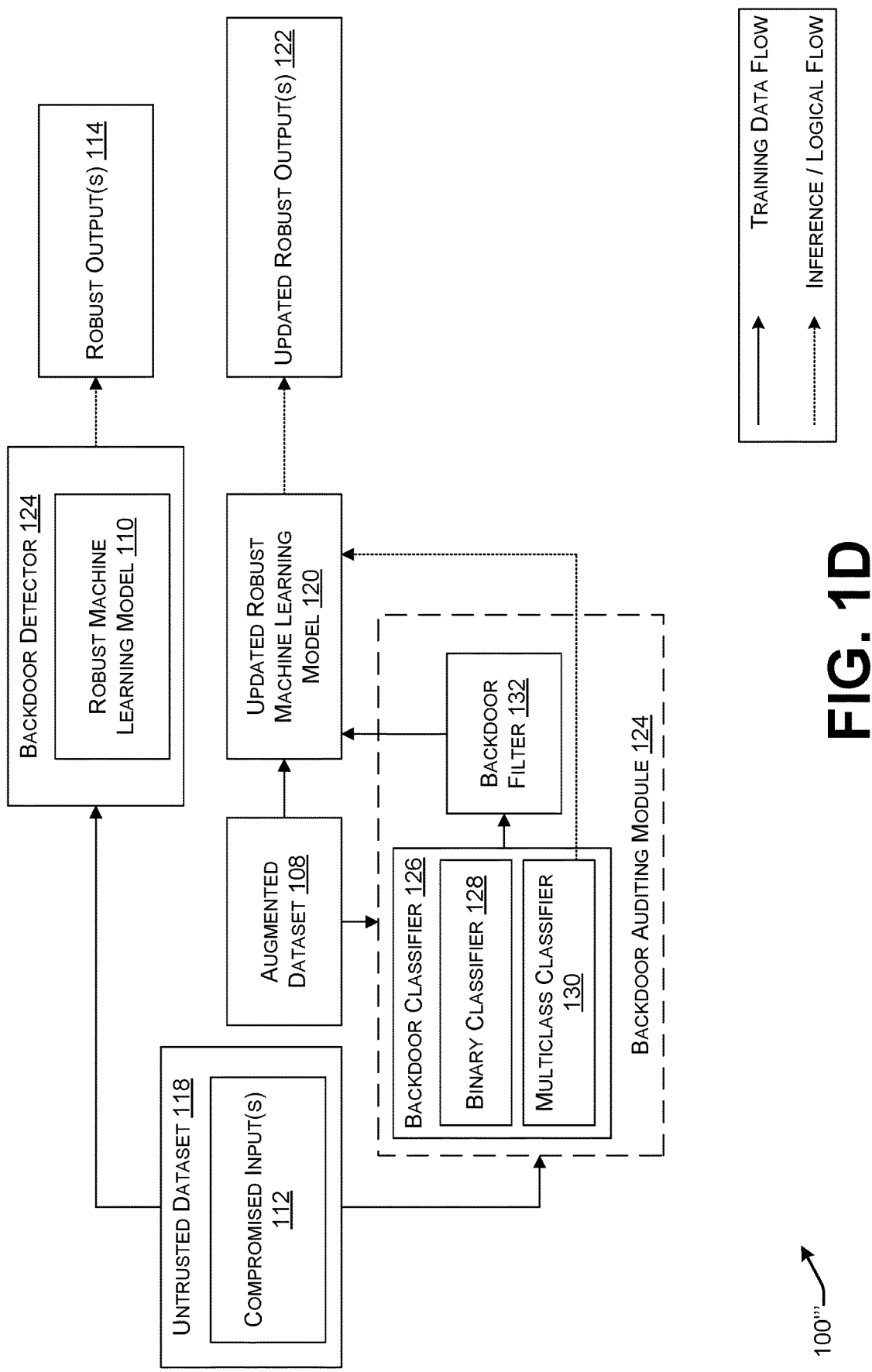
FIG. 1D illustrates the machine learning model training system in an alternative second phase of operation.

Alternatively, as shown in the system 100''' of FIG. 1D, a backdoor detector can be constructed using the robust machine learning model 110. Since the previous robust machine learning model 110 can generate correct outputs for compromised inputs 112, the robust outputs can disagree with the label for a compromised input 112. As such, this disagreement can indicate the presence of a compromised input 112. It should be understood that while a particular discussion is given to specific types of backdoor attacks, any type of text-based trigger can be discovered and/or learned by the system and the/or the updated robust machine learning model 120. Furthermore, the untrusted dataset 118 can be provided to a backdoor auditing module 124 for additional processing to enhance the retraining process of the updated robust machine learning model 120. The backdoor auditing module 124 can also serve to perform auditing of training data for the updated robust machine learning model 120 in the event a data poisoning attack occurs.

In various examples, the backdoor auditing module 124 can include a backdoor classifier 126 for detecting and identifying compromised inputs 112 within the untrusted dataset 118. The backdoor classifier 126 can itself include a binary classifier 128 as well as a multiclass classifier 130. The binary classifier 128 can be configured to detect the presence of compromised inputs 112 hence the binary nature of the binary classifier 128. Conversely, the multiclass classifier 130 can be configured to determine a specific type of attack such as syntactic paraphrase, synonym replacement, and other attack types. This information can be provided to the updated robust machine learning model 120 during retraining.

In addition, the inputs of the untrusted dataset 118 can undergo additional processing by a backdoor filter 132 before being provided to the updated robust machine learning model 120. For instance, the backdoor classifier 126 may identify a compromised input 112 that utilizes an unknown attack type. This compromised input 112 can be filtered out by the backdoor filter 132 so as to prevent the updated robust machine learning model 120 from infection prior to proper analysis by the system and/or an administrative entity. In this way, the updated robust machine learning model 120 can learn new attack types from the untrusted dataset 118 without compromising integrity or normal operations.

Figure 2:
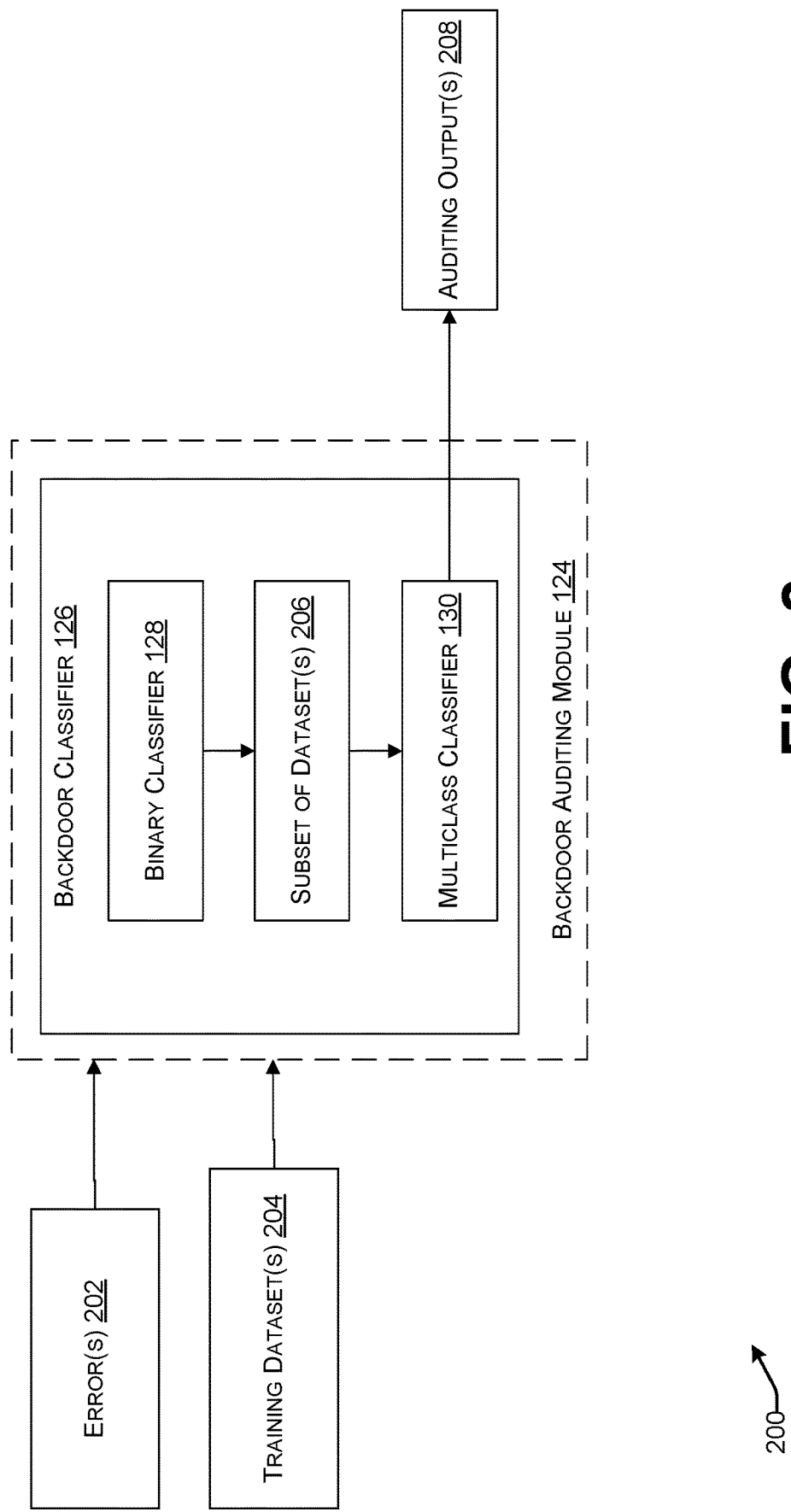
FIG. 2 illustrates a backdoor auditing module performing data auditing in response to an error at an output of a machine learning model.

Turning now to FIG. 2, additional aspects a system 200 utilizing the backdoor auditing module 124 are shown and described. As mentioned above, the backdoor auditing module 124 can also be configured to perform auditing of training data in the event an updated robust machine learning model 120 becomes compromised. In various examples, this can occur if a compromised input 112 is unsuccessfully filtered by the backdoor filter or is undetected by the backdoor classifier 126. As a result, the system can detect an error 202 such as through comparison of the reference outputs 116 and robust outputs 114 discussed above. In response to the error 202, the disclosed system can perform a data audit by providing the training datasets 204 that were used to train the machine learning model 104, the robust machine learning model 110, and/or the updated robust machine learning model 120 to the backdoor auditing module 124. The training datasets 204 can include the initial data set 102, the augmented dataset 108, and/or the untrusted dataset 118 as well as any other datasets that the various machine learning models 104, 110, and 120 analyzed over the course of training and/or retraining.

As described above, the backdoor auditing module 124 can utilize a backdoor classifier 126 to analyze the training dataset 204 to track down the source of the initial error 202. The backdoor classifier 126 can include a binary classifier 128 and a multiclass classifier 130. In this example, the binary classifier 128 can be configured to detect the presence of suspicious and/or compromised inputs 112 in each of the training datasets 204. From this analysis of the training datasets 204, the binary classifier 128 can determine a subset of datasets 206 that contain the cause of the error 202. The subset of datasets 206 can be provided to the multiclass classifier 130 to determine the type of attack or other compromise that caused the initial error 202. For example, the multiclass classifier 130 may identify a synonym substitution attack in a dataset of the subset of datasets 206. In another example, the multiclass classifier 130 may detect an improperly formatted input that caused the error 202. It should be understood that while the backdoor classifier 126, the binary classifier 128 and the multiclass classifier 130 can typically be implemented as machine learning models, any suitable method can be used.

From analysis of the subset of datasets 206, the backdoor auditing module 124 can generate an auditing output 208 that specifies the subset of datasets 206 as well as the type of compromise that caused the error 202. In some scenarios, the auditing output 208 can be provided to an administrative entity such as a system engineer alerting them to the error and the root cause. In another example, the auditing output 208 can be a ranked list of compromise types. For example, the compromise types can be ranked according to a likelihood, or a confidence calculated by the multiclass classifier 130.

Alternatively, the auditing output 208 can be configured to automatically cause the system to activate security measures in response to the error. For instance, if the error 202 affects the machine learning model 104, the subset of datasets 206 containing the compromise can be removed from the training process for the machine learning model 104. In another example, the affected portions of the system such as the robust machine learning model 110 can be disabled to mitigate the impact of the compromise.

Figure 3:
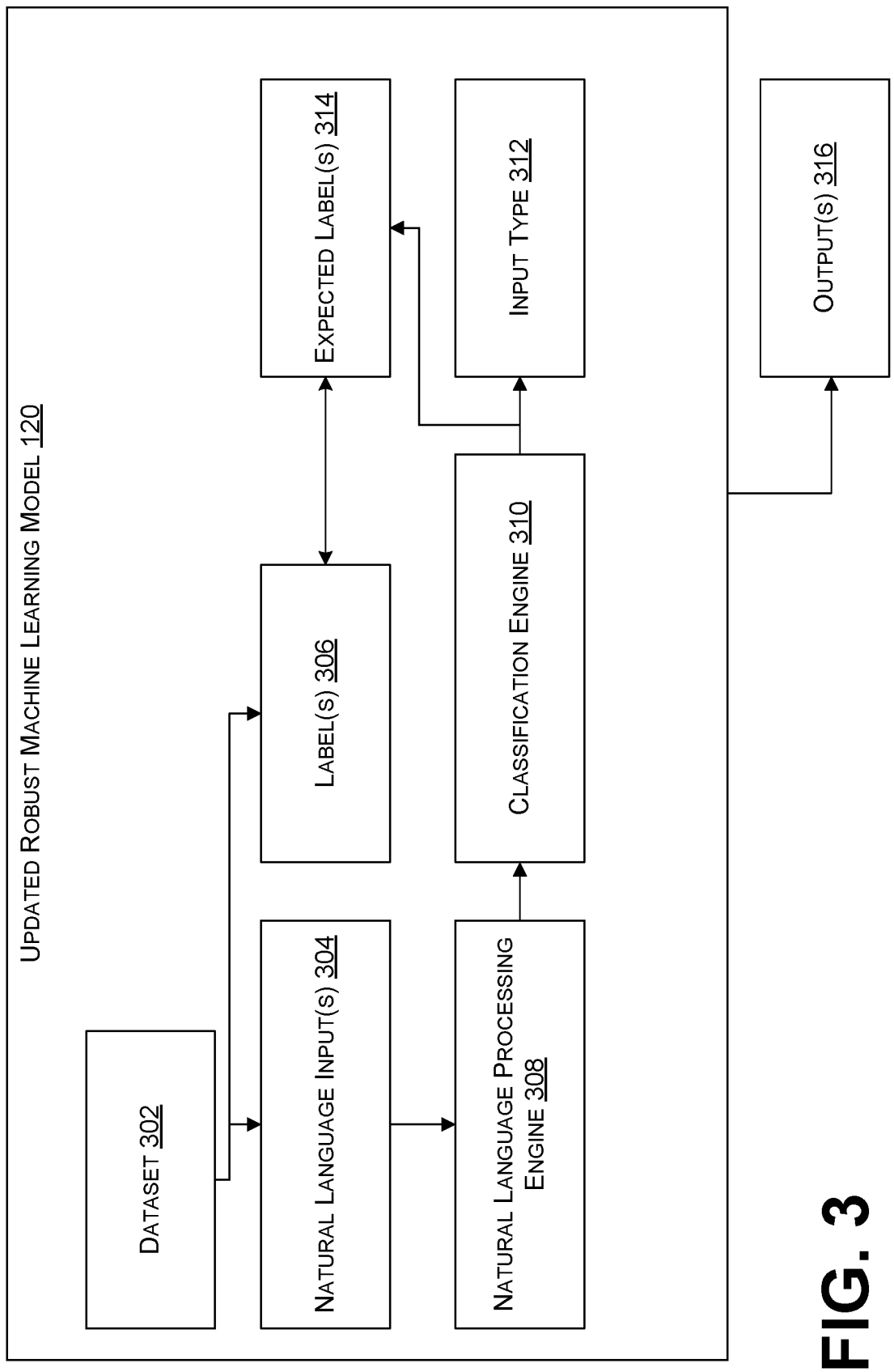
FIG. 3 is a block diagram of an updated robust machine learning model processing inputs of a dataset.

Turning now to FIG. 3, aspects of the updated robust machine learning model 120 are shown and described. As discussed above with respect to FIGS. 1A-1D, the updated robust machine learning model 120 can be trained to resist various classes of attacks. In various examples, the updated robust machine learning model 120 can receive a dataset 302 that contains a set of inputs. The inputs can include a natural language input 304 which can be a word or a string of text. In addition, the input can include a label 306. In various examples, the label can be metadata that describes the content of the input in a format that is compatible with the updated robust machine learning model 120. For example, a label 306 may indicate that an associated natural language input 304 refers to a person, a place, or an object.

To analyze the natural language inputs 304, the updated robust machine learning model 120 can utilize a natural language processing engine 308. The natural language processing engine 308 can parse individual words of a natural language input 304 and derive meaning based on relations between the words as well as surrounding context if available. Once parsed, the data can then be provided to a classification engine 310. Based on the meaning of the input derived by the natural language processing engine 308, the classification engine 310 can assign an input type 312 to the natural language input 304. For instance, the input type 312 can indicate whether the natural language input 304 contains an attack such as synonym substitution.

In addition, the classification engine 310 can assign an expected label 314 to the natural language input 304. The expected label 314 can be compared against the label 306 originally provided with the natural language input 304. In one example, the natural language input 304 may express a positive sentiment about a particular topic. Accordingly, the expected label 314 generated by the classification engine 310 can indicate positive sentiment. However, the label 306 states that the natural language input 304 expresses a negative sentiment. This disagreement between the label 306 and the expected label 314 can be analyzed by the system to determine the cause. In one scenario, the classification engine 310 was incorrect and thus the updated robust machine learning model 120 can learn and correct future predictions. Alternatively, if the updated robust machine learning model 120 is already trained, as is most likely, the natural language input 304 can be marked as potentially malicious. Even if the input type 312 does not indicate a known attack type, a mismatch between the label 306 and the expected label 314 when the confidence of the updated robust machine learning model 120 is high can indicate a malicious input. This discrepancy and the potentially malicious input can be captured in an output 316 and provided to an administrative entity for analysis.

We will now introduce the settings of various testing scenarios to evaluate aspects of the techniques discussed above. We focus on the sentiment analysis task with two widely used datasets: Stanford Sentiment Treebank (SST-2) and IMDB. In case of no official validation split, we randomly split the original training set into 80% training data and 20% validation data.

Since our settings assume that the trusted and untrusted data follow a similar distribution, we evenly divide the training and validation data of SST-2 into two disjoint subsets, called SST-2A and SST-2B. SST-2A represents the trusted data, which we use to generate benign backdoor samples for later augmentation. SST-2B represents the new data coming from untrusted sources, which potentially contain adversarial backdoor samples. For a fair comparison across different settings, SST-2A and SST-2B share the same test split from the original SST-2.

In the untrusted data SST-2B, some samples are replaced by adversarial backdoor samples having a target label chosen by the attacker. We refer to the portion of such samples as the backdoor ratio, where a larger ratio indicates a stronger backdoor attack. Since the model trainer cannot distinguish benign and backdoor samples, such samples will be evenly divided into the training and validation splits. In all scenarios, we set the target label to "positive" and the backdoor ratio to 0%, 10%, 20%, and 30%.

From the trusted data SST-2A, we choose some samples to generate benign backdoor samples, where the label is not changed. We refer to the portion of such samples as the augmentation ratio. These benign backdoor samples form the additional data that we will use to augment the training. In all scenarios, we consider an augmentation ratio up to 60%.

We evaluate the performance of backdoor defenses using three metrics. (1) Clean Accuracy, i.e., the model's classification accuracy on the clean test set. The clean accuracy measures if a defense would hurt the model's normal performance. (2) Attack Success Rate (ASR), i.e., the model's classification accuracy on the backdoored test set, which consists of backdoor samples whose ground-truth label is not the target label. ASR measures the effectiveness of backdoor attacks under potential defenses. (3) Accuracy on Benign Backdoor Data (ACC-B), i.e., the model's classification accuracy on the backdoored test set where all samples are backdoored without changing their labels. This metric measures the model's ability of classifying benign samples that contain the backdoor pattern. Overall, an ideal defense should decrease ASR without hurting CACC and ACC-B.

We choose BERT with the pre-trained bert-base-uncased model from the Transformers library as the victim model. It has 12 layers, 768 dimensional hidden states, and 12 self-attention heads. The training procedure consists of two stages. At stage-1, we fine-tune the model on the trusted SST-2A and the augmented data for 5 epochs. At stage-2, we continue fine-tuning the model on all data from stage-1 and the untrusted SST-2B for 10 epochs. We always fine-tune the model on the training split using the Adam optimizer with an initial learning rate 2e-5. After each stage, we select the best model from the validation split and report the final results on the test split. Note that both the training and validation splits contain backdoor samples, as explained in above.

We choose three representative textual backdoor attacks for evaluation, including two invisible attacks and one visible attack: Syntactic Paraphrasing, Synonym Substitution, and Token Insertion.

A Syntactic Paraphrasing attack chooses an uncommon syntactic template as the invisible trigger. It injects the trigger by paraphrasing sentences using syntactic controlled paraphrase models, such as SCPN. We choose S(SBAR) (,) (NP)(VP)(.) as the trigger syntactic template, which was reported to have the best performance.

A Synonym Substitution attack chooses uncommon synonyms as the trigger. It injects the trigger by replacing each word using predefined replacement rules. We consider the rule-based variant of the original learning-based word substitution trigger, as the latter trigger requires control of the whole training procedure and is out of the scope of this paper. We generate candidate synonyms for all datasets independently. In particular, SST-2A and SST-2B share a different set of candidates.

A Token Insertion attack chooses uncommon words as the trigger and randomly inserts them into the benign samples. Unlike the previous two invisible attacks, this attack is visible and can be easily prevented by data inspection-based defenses.

We now evaluate the defense framework by using it to protect the training procedure against invisible textual backdoor attacks. Our evaluation produced the following results:

We demonstrate that augmenting the training data with benign backdoor samples can effectively mitigate invisible textual backdoor attacks, including syntactic paraphrasing and rule-based synonym substitution without hurting the model's natural performance.

We demonstrate that the model effectively learns the invisible patterns that the attacker assumes to have a low frequency, thereby decreasing the performance of backdoor attacks.

We show that the model must be trained jointly with the benign and adversarial backdoor data. If trained separately, the model will forget previously learned invisible patterns and fail to prevent backdoor attacks.

We show that the defender can leverage the knowledge of least-frequent invisible textual patterns to learn a classifier, which identifies invisible textual triggers in previously unseen samples.

Firstly, we investigate the effectiveness of Benign Backdoor Augmentation against invisible backdoor attacks, including Syntactic Paraphrasing and Synonym Substitution, which take uncommon syntactic templates and synonyms as the invisible trigger, respectively. These attacks produce triggers that are easier to evade from manual or automatic data inspection, thereby preventing backdoor samples from being detected and removed. In particular, they have been shown to be resistant to data inspection-based defenses. However, our analysis reveals that these attacks rely on a limited set of invisible textual patterns known to the public, which contradicts the secrecy of backdoor triggers, and enables the defender to leverage such knowledge.

In this testing scenario, we assume that the attacker will choose the least-frequent invisible textual pattern as the trigger in each attack (to achieve their best performance), and the defender will augment the training data with such textual patterns. After that, we evaluate the model's performance on backdoor and benign test samples.

We find that augmenting benign backdoor samples can effectively reduce the effectiveness of invisible backdoor attacks. As we increase the augmentation ratio, the attack success rate decreases towards the non-backdoor case. We are able to decrease the attack success rate because of the public knowledge of invisible backdoor triggers. While these invisible attacks have been shown to be resistant to data inspection-based defenses, we show that such attacks are limited by their dependence on low-frequency invisible textual patterns that are known to the public.

We also find that augmenting benign backdoor samples does not hurt the model's normal performance. There is no significant difference when the augmentation is either disabled (with zero augmentation ratio) or enabled (with non-zero augmentation ratio).

We observe that benign backdoor augmentation can effectively mitigate invisible backdoor attacks where existing data inspection-based defenses fall short. As previous invisible backdoor attacks have shown, these attacks obtain the best performance only when the chosen trigger manifests as least-frequent patterns. However, invisible least-frequent patterns are quite limited and publicly known in the textual domain. This limitation enables us to leverage data augmentation to effectively increase the frequency of least-frequent patterns, which naturally mitigates invisible backdoor attacks.

Secondly, we investigate what the model learns when trained with augmented benign backdoor data. Our goal is to determine whether the model learns an invisible textual pattern that the attacker assumes has a low frequency, and whether the augmented data hardens the learning of adversarial backdoor samples. In this testing scenario, we follow the same setting as our previous scenario discussed above.

From the results of this testing scenario, we find that the model's clean accuracy on benign backdoor samples in the test set is closely associated with the model's generalizability to the given invisible textual pattern. When the backdoor ratio is zero, the model obtains around 80% accuracy on the benign backdoor samples, demonstrating the basic generalizability to a given textual pattern. However, when the backdoor ratio is not zero (i.e., there is an attack), the model only obtains around 50% accuracy on benign backdoor samples (where positive and negative samples are evenly distributed). It implies that the model loses the ability to classify samples containing the backdoor pattern. As a result, the model needs augmented benign backdoor samples to learn the textual pattern and finally returns to around 80% accuracy in the non-attack case.

Furthermore, the testing scenario also reveals that when the augmentation ratio is zero, the attack obtains a nearly 100% success rate throughout the training procedure. As we increase the augmentation ratio, we observe that the increase of attack success rate slows down. When the augmentation ratio matches the backdoor ratio, we observe an instability of the attack success rate across training epochs.

We observe that the model effectively learns the textual patterns (from augmented data) that the attacker assumes to have a low frequency. We also show that augmented benign backdoor samples play an important role in preserving the model's ability to classify benign samples containing these backdoor patterns.

We next investigate the effectiveness of different strategies of backdoor augmented training for the syntactic paraphrasing attack. In all cases, we adopt the pre-trained BERT model and fine-tune it on downstream tasks in two stages. We consider two strategies when fine-tuning the model.

At the first stage, we always fine-tune the model on both trusted and augmented data. The resulting model obtains 14.90% ASR and 83.89% accuracy on benign backdoor samples. The non-zero ASR of an un-backdoored model indicates the model's natural error rate on samples containing low-frequency textual patterns.

At the second stage, we continue fine-tuning the model on untrusted data, but optionally with the trusted and augmented data. When the trusted and augmented data is not included at the second stage, the resulting model shows significantly lower accuracy on benign backdoor samples and higher ASR. It indicates that the model will forget previously learned benign backdoor samples and fail to prevent the backdoor attack. In contrast, by fine-tuning the model on both augmented and untrusted data and is able to preserve the accuracy on benign backdoor samples, thus reducing the increment of ASR. It shows that untrusted data should be used jointly with trusted and augmented data.

Finally, we study the effectiveness of the standalone Backdoor Classifier in FIG. 1 that aims to identify if input samples are clean or poisoned by a specific backdoor attack. The output of this classifier can aid analysts in identifying potential backdoor examples. In particular, we study if this classifier directly generalizes to different domains.

In this testing scenario, we fine-tune a BERT model to classify samples into four classes: the clean sample and the backdoored sample using token insertion, syntactic paraphrasing, and synonym substitution. We construct training data on SST-2 and test data on IMDB. For each class of backdoor attack, we poison the entire training and test set with this attack to generate the training and test data for this class, respectively. The resulting classifier achieves 64.9% accuracy with a confusion matrix. Note that we directly adapt the classifier trained on SST-2 to IMDB. As we can observe, the backdoor classifier is able to effectively identify invisible attacks, such as syntactic paraphrasing and synonym substitution. It shows that one can leverage the knowledge of invisible attacks to identify such attacks in previously unseen samples.

Figure 4:
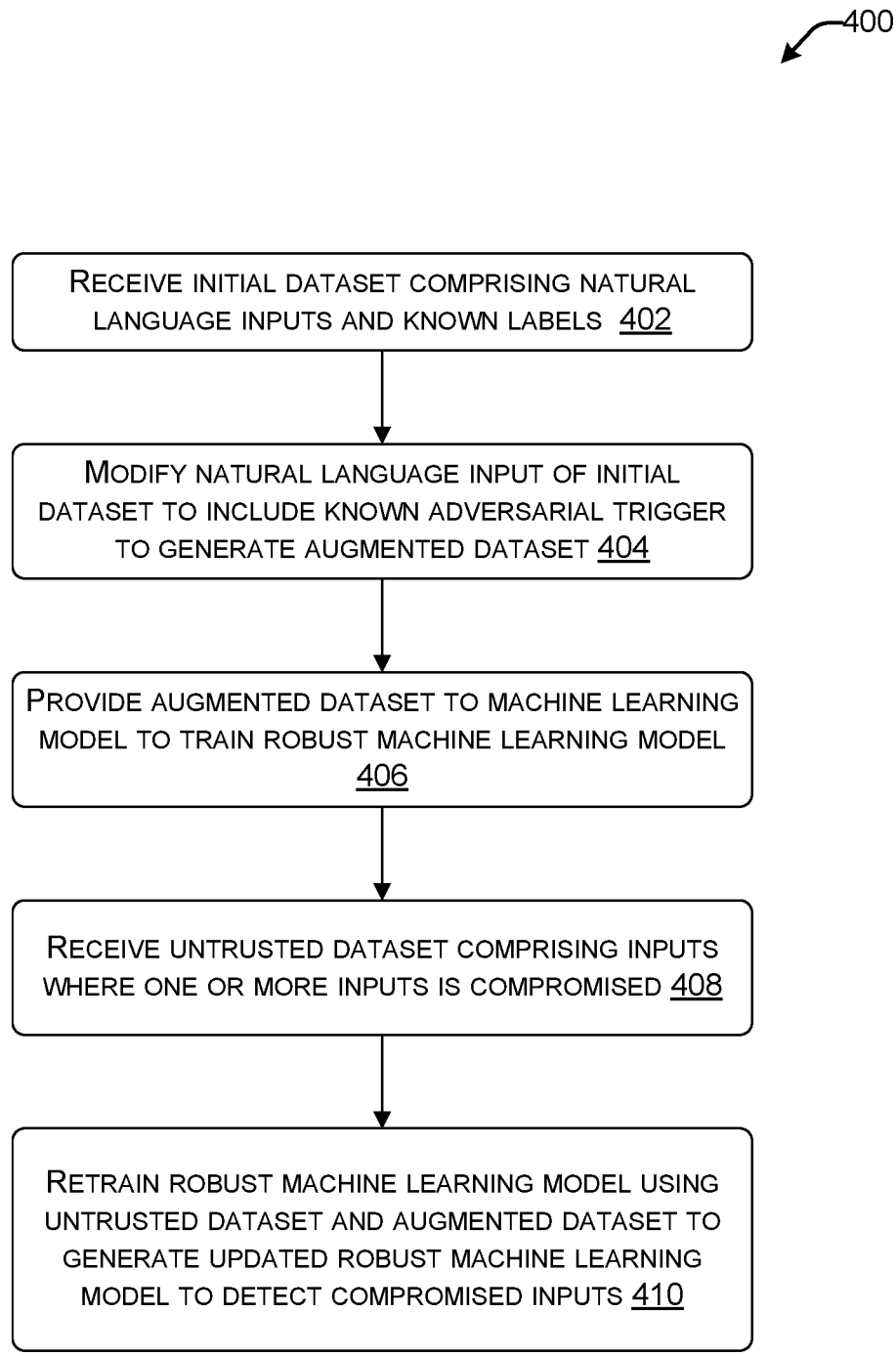
FIG. 4 is a flow diagram showing aspects of a routine for training a machine learning model to resist various classes of data poisoning attacks.

Turning now to FIG. 4, aspects of a routine 400 for enabling machine learning training through benign backdoor augmentation is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, the routine 400 begins at operation 402 where a system receives an initial dataset that includes natural language inputs and known labels associated with each natural language input. As described above, the initial dataset can be verified by an administrative entity as trustworthy and originating from a known source. In addition, the initial dataset can be used to train a machine learning model which can serve as a baseline for subsequent models.

Next, at operation 404, the natural language input of some or all of the inputs of the initial dataset are modified to include a known adversarial trigger. This modification results in an augmented dataset. The known adversarial triggers can include a syntactic paraphrase, a synonym replacement, or a token trigger.

Then, at operation 406, the augmented dataset is provided to the machine learning model to generate a robust machine learning model. As discussed above, the robust machine learning model can be resilient to the various attack types captured by the augmented dataset using the known adversarial triggers.

Next at operation 408, the system receives an untrusted dataset where one or more of the constituent inputs is compromised. These compromised inputs can utilize the same adversarial triggers captured by the augmented dataset or others that can be discovered by the robust machine learning model.

Finally, at operation 410, the robust machine learning model is retrained using the untrusted dataset in addition to the augmented dataset to generate an updated robust machine learning model. The updated robust machine learning model can be enabled by the retraining to detect and classify new untrusted inputs by gaining awareness of various attack methods and adversarial triggers.

Figure 5:
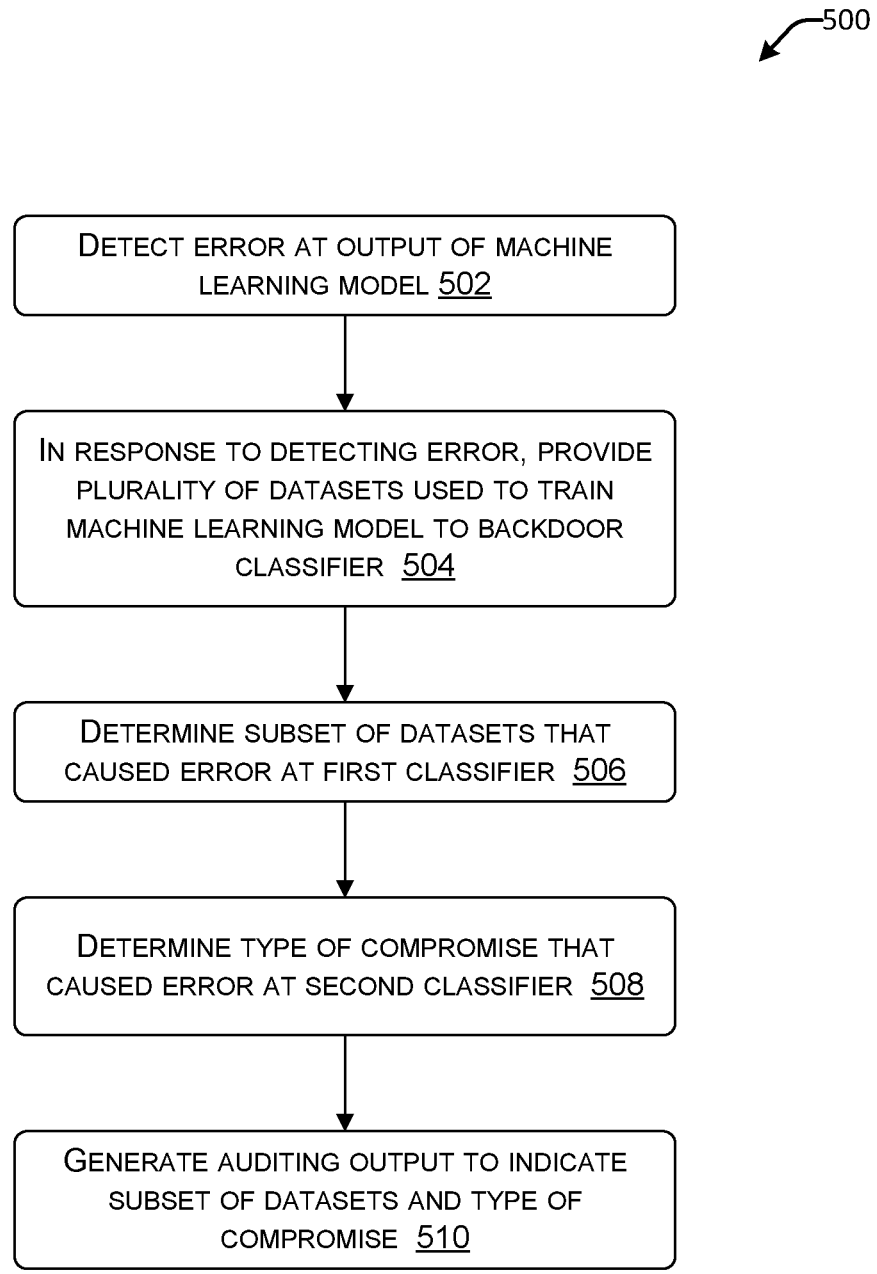
FIG. 5 is a flow diagram showing aspects of a routine for performing data auditing in response to detecting an error at an output of a machine learning model
Figure 6:
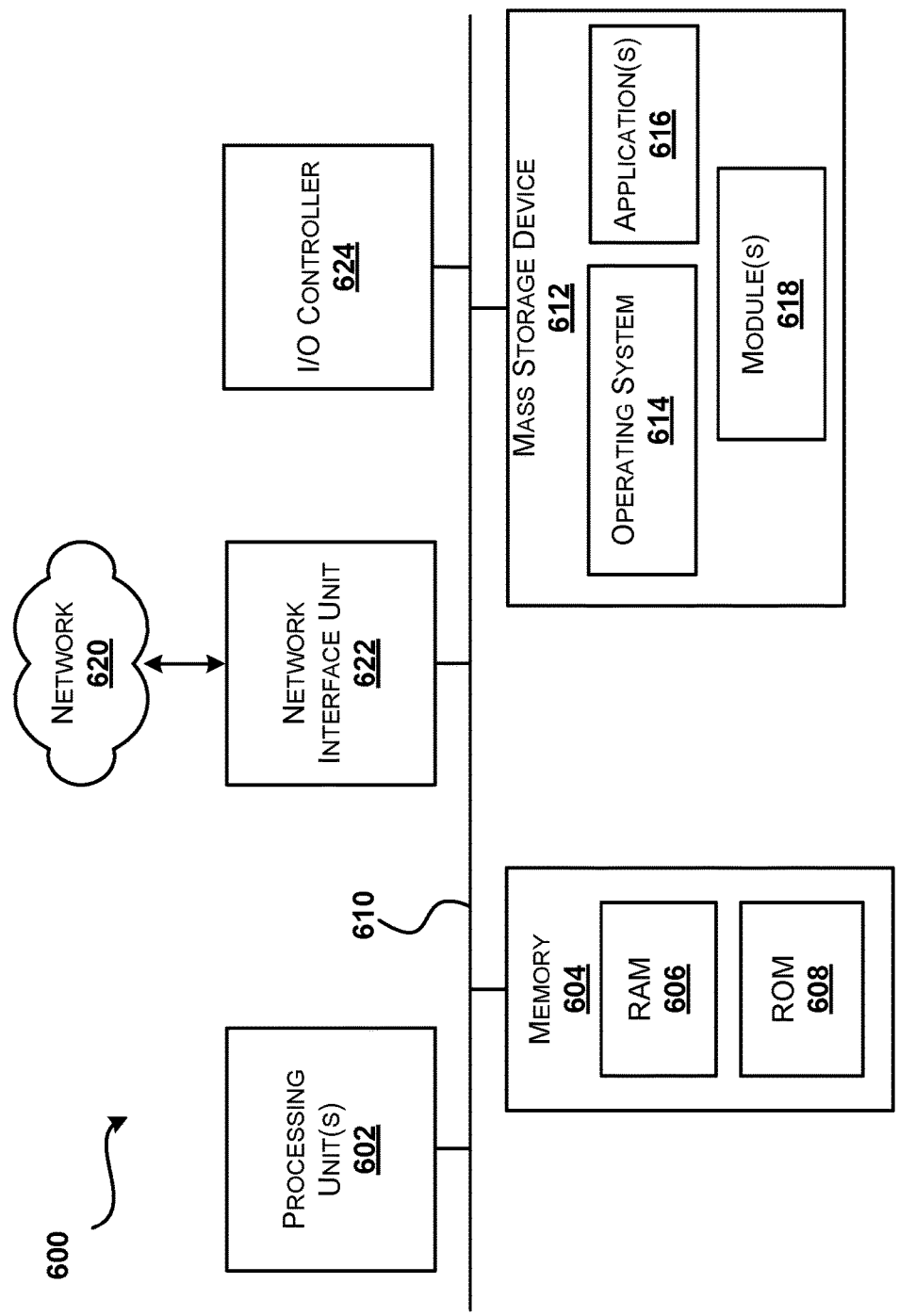
FIG. 6 is a computer architecture diagram illustrating an illustrative computer hardware and software architecture for a computing system capable of implementing aspects of the techniques and technologies presented herein.
Figure 7:
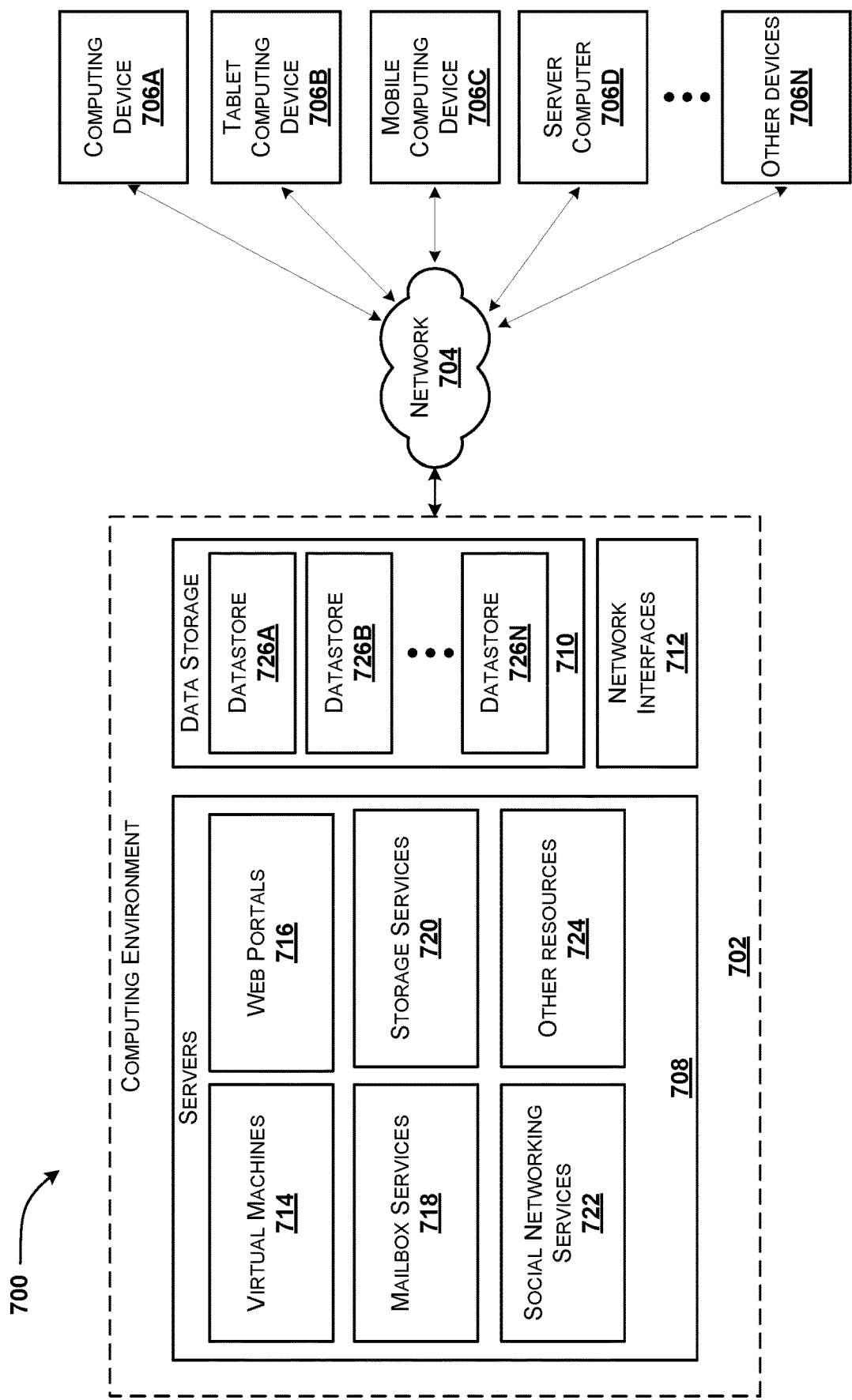
FIG. 7 is a diagram illustrating a distributed computing environment capable of implementing aspects of the techniques and technologies presented herein.

Turning now to FIG. 5, aspects of a routine 500 for enabling data auditing for machine learning models is shown and described. The routine 500 begins at operation 502 where a system detects an error at an output of a machine learning model. For instance, this error can be detected by comparing the output of the robust machine learning model to the reference outputs of the machine learning model.

Next, at operation 504, in response to detecting the error, a plurality of datasets used to train the machine learning model are provided to a backdoor classifier. As mentioned above, these datasets can include the initial dataset, the augmented dataset, and/or the untrusted dataset.

Then, at operation 506, a first classifier determines a subset of the datasets that caused the error. The first classifier can be a binary classifier.

Next, at operation 508, a second classifier determines the type of compromise within the subset of datasets that caused the error. The second classifier can be a multiclass classifier.

Finally, at operation 510, the system generates an auditing output that indicates the subset of datasets and the type of compromise that caused in the initial error. As mentioned above, the auditing output can also cause activation of security measures as well as alert an administrative entity to the error.

The disclosure presented herein also encompasses the subject matter set forth in the following clauses.

In a first aspect, the present disclosure can comprise a method for training a machine learning model to classify inputs comprising: receiving an initial dataset comprising a first plurality of inputs comprising a natural language input and a known label. The initial dataset may also be referred to as a clean dataset, or trusted dataset. In various examples, the trusted dataset can be generated by an administrative entity that also manages the training of the system for resisting adversarial attacks including data poisoning attacks and/or backdoor attacks. As mentioned above, the trusted dataset can be verified through various methods such as cryptographic hashing, encryption, data locks, and the like. In addition, the trusted dataset can include a data generated by the administrative entity as well as well-known publicly available datasets such as those discussed above. In addition, by providing the trusted dataset to a clean (e.g., existing or trusted) machine learning model, the administrative entity can expect pristine or clean outputs. Stated another way, providing trusted data to a trusted machine learning model logically results in nominal operation and thus an expected clean output.

After receiving the initial (e.g., trusted) dataset, modifying the natural language input of one or more of the inputs of the initial dataset to include a known backdoor trigger to generate an augmented dataset. It should be understood that modifying the natural language input of a particular input can include various methods such as those discussed above. In one example, modifying the natural language input can be synonym substitution in which one or more words of the natural language input are respectively replaced with an uncommon synonym. In other examples, modifying the natural language input can include other methods such as syntactic paraphrasing, or token insertion. In addition, while the natural language portion of the input may be modified, inputs of the augmented dataset may retain the known label of the trusted dataset.

Once the augmented dataset is generated, providing the augmented dataset to the machine learning model to train a robust machine learning model (also referred to simply as a robust model) for resisting one or more types of adversarial attacks. As mentioned above, training an existing machine learning model with the augmented dataset provides that machine learning model with knowledge of potential attacks such as synonym substitution. In this way the resulting robust machine learning model can correctly label or otherwise classify an input despite that input having one or more backdoor triggers.

After training the robust machine learning model, receiving an untrusted dataset comprising a second plurality of inputs wherein one or more inputs of the second plurality of inputs are compromised. In various examples, the untrusted dataset can include data or samples that are retrieved from deployment of the system in a live setting. While the robust model was trained with prepared samples of the augmented dataset to resist various attacks, untrusted data can be much more unpredictable and may include several triggers, modified labels, as well as other compromises. As such, the untrusted data can be leveraged to enhance the resilience of the robust machine learning against various adversarial attacks.

Accordingly, re-training the robust machine learning model using the untrusted dataset and the augmented dataset to generate a new robust machine learning model (or simply new robust model) for classifying inputs can result in improved security of the overall system. Re-training with the untrusted dataset and the robust dataset can include various approaches. For instance, weights can be applied to emphasize or deemphasize the impact of the augmented dataset or the untrusted dataset. Alternatively, the system may use proportionally less untrusted data in relation to the augmented dataset or vice versa.

In a second aspect, the present disclosure can comprise a method for performing data auditing comprising: detecting an error at an output of a machine learning model. In various examples, the error can occur in a live deployment setting. Stated another way, the new robust machine learning model mentioned above may be fully trained and is thus deployed as part of a larger application or system. As such, the new robust machine learning model may be processing a high volume of untrusted data and may generate an incorrect or unexpected output.

Thus, in response to detecting the error, providing a plurality of datasets that were used to train the machine learning model to a backdoor classifier comprising a first classifier and a second classifier. In a specific example, the first classifier and the second classifier can comprise a binary classifier and a multiclass classifier respectively. However, it should be understood that the first classifier and the second classifier may be implemented using any suitable method.

Subsequently determining, at the first classifier, a subset of the datasets that caused the error. In various examples, the first classifier can be a binary classifier that can analyze the plurality of datasets to determine whether one or more datasets contain erroneous or suspicious inputs. For example, the binary classifier can detect that a particular training dataset contains a synonym substitution attack. The binary classifier can then indicate the offending dataset as a source of error. This process can be repeated for any number of datasets.

Once one or more datasets have been identified by the first classifier, determining, at the second classifier, a type of compromise of the subset of the datasets that caused the error. In a specific example, the second classifier can be a multiclass classifier which can identify various types of errors or compromises. In various examples, the multiclass classifier can receive one or more datasets identified by the first classifier as erroneous or suspicious. Accordingly, the multiclass classifier can analyze the identified datasets to determine a root cause of the original error. For instance, the multiclass classifier may identify a syntactic paraphrasing attack in a particular dataset. In another example, the multiclass classifier may detect that an error was simply caused by a misconfigured input and was not necessarily malicious.

Accordingly, the system can proceed to generate an auditing output indicating the subset of datasets that caused the error and the type of compromise. In various examples, the auditing output may be presented to an administrative entity such as a system administrator or engineer to provide insight and inform subsequent iterations of the system. Furthermore, the auditing output may be used to train the machine learning model that originally produced the error to give the machine learning model new knowledge and enhance resilience against various errors or attacks. In addition, the system can be configured to perform filtering of the datasets identified by the first classifier to generated filtered data. In various examples, filtering can include receiving the datasets from the first classifier and utilize the insights generated by the second classifier to remove or clearly mark erroneous inputs. In this way the filtered data can be used to further train the machine learning model. The filtered data may also be included as part of the auditing outputs to provide more detailed insights to the administrative entity.

In addition, the disclosure presented herein also encompasses the subject matter set forth in the following claim clauses.

Example Clause A, a method for training a machine learning model (104) to classify inputs comprising: receiving an initial dataset (102) comprising a first plurality of inputs comprising a natural language input (304) and a known label (306); modifying the natural language input (304) of one or more of the inputs of the initial dataset (102) to include a known adversarial trigger to generate an augmented dataset (108); providing the augmented dataset (108) to the machine learning model (104) to train a robust machine learning model (110) for resisting one or more types of adversarial attacks; receiving an untrusted dataset (118) comprising a second plurality of inputs wherein one or more inputs of the second plurality of inputs are compromised (112); and retraining the robust machine learning model (110) using the untrusted dataset (118) and the augmented dataset (108) to generate an updated robust machine learning model (120) for detecting a compromised input (112).

Example Clause B, the method of Example Clause A, further comprising: detecting, using the updated robust machine learning model, a compromised input comprising a natural language input and a compromised label; in response to detecting the compromised input, generating robust outputs to produce a corrected label associated with the natural language input of the compromised input; and removing the compromised label from the compromised input.

Example Clause C, the method of Example Clause A or Example Clause B, wherein detecting a compromised input comprises: providing an untrusted input to the robust machine learning model; processing the input using the robust machine learning model to generate a label associated with a natural language portion of the untrusted input; comparing the label to an untrusted label of the untrusted input; detecting a mismatch between the label and the untrusted label; and generating an alert indicating the untrusted input as a compromised input in response to detecting the mismatch.

Example Clause D, the method of any one of Example Clause A through C wherein retraining the robust machine learning model further comprises: providing the untrusted dataset to a backdoor classifier; detecting one or more unknown attack types associated with one or more compromised inputs within the untrusted dataset using the backdoor classifier; and in response to detecting the one or more unknown attack types, removing the compromised inputs from the untrusted dataset to prevent a compromise of the robust machine learning model.

Example Clause E, the method of any one of Example Clause A through D, wherein an output of the robust machine learning model causes an activation of one or more security mechanisms in response to detecting a compromised input.

Example Clause F, the method of any one of Example Clause A through E, wherein a compromised input comprises one or more of a syntactic paraphrase, a synonym replacement, or a token trigger.

Example Clause G, the method of any one of Example Clause A through F, wherein the untrusted dataset comprises a plurality of untrusted inputs comprising an unknown natural language input and an untrusted label.

Example Clause H, a system (100) for training a machine learning model (104) to classify inputs comprising: one or more processing units; and a computer-readable memory having encoded thereon computer-readable instructions that when executed by the one or more processing units, causes the system to: receive an initial dataset (102) comprising a first plurality of inputs comprising a natural language input (304) and a known label (306); modify the natural language input (304) of one or more of the inputs of the initial dataset (102) to include a known adversarial trigger to generate an augmented dataset (108); provide the augmented dataset (108) to the machine learning model (104) to train a robust machine learning model (110) for resisting one or more types of adversarial attacks; receive an untrusted dataset (118) comprising a second plurality of inputs wherein one or more inputs of the second plurality of inputs are compromised (112); and retrain the robust machine learning model (110) using the untrusted dataset (118) and the augmented dataset (108) to generate an updated robust machine learning model (120) for detecting a compromised input (112).

Example Clause I, the system of Example Clause H, wherein the computer-readable instructions further cause the system to: detect, using the updated robust machine learning model, a compromised input comprising a natural language input and a compromised label; in response to detecting the compromised input, generate robust outputs to produce a corrected label associated with the natural language input of the compromised input; and remove the compromised label from the compromised input.

Example Clause J, the system of Example Clause H or Example Clause I, wherein the computer-readable instructions further cause the system to: provide an untrusted input to the robust machine learning model; process the input using the robust machine learning model to generate a label associated with a natural language portion of the untrusted input; compare the label to an untrusted label of the untrusted input; detect a mismatch between the label and the untrusted label; and generate an alert indicating the untrusted input as a compromised input in response to detecting the mismatch.

Example Clause K, the system of any one of Example Clause H through J, wherein the computer-readable instructions further cause the system to: provide the untrusted dataset to a backdoor classifier; detect one or more unknown attack types associated with one or more compromised inputs within the untrusted dataset using the backdoor classifier; and in response to detecting the one or more unknown attack types, remove the compromised inputs from the untrusted dataset to prevent a compromise of the robust machine learning model.

Example Clause L, the system of any one of Example Clause H through J, wherein an output of the robust machine learning model causes an activation of one or more security mechanisms in response to detecting a compromised input.

Example Clause M, the system of any one of Example Clause H through J, wherein a compromised input comprises one or more of a syntactic paraphrase, a synonym replacement, or a token trigger.

Example Clause N, the system of any one of Example Clause H through J, wherein the untrusted dataset comprises a plurality of untrusted inputs comprising an unknown natural language input and an untrusted label.

Example Clause O, a method for performing data auditing comprising: detecting an error (202) at an output of a machine learning model (104); in response to detecting the error (202), providing a plurality of datasets (204) that were used to train the machine learning model (104) to a backdoor classifier (126) comprising a first classifier (128) and a second classifier (130); determining, at the first classifier (128), a subset of the datasets (206) that caused the error (202); determining, at the second classifier (130), a type of compromise of the subset of the datasets (206) that caused the error (202); and generating an auditing output (208) indicating the subset of datasets (206) that caused the error (202) and the type of compromise.

Example Clause P, the method of Example Clause O, wherein the type of compromise comprises one or more of a syntactic paraphrase, a synonym replacement, or a token trigger.

Example Clause Q, the method of Example Clause O or Example Clause P, wherein the first classifier is a binary classifier machine learning model.

Example Clause R, the method of any one of Example Clause O through Q, wherein the second classifier is a multiclass classifier machine learning model.

Example Clause S, the method of any one of Example Clause O through R, wherein the auditing input causes an activation of one or more security measures in response to detecting the error at the output of the machine learning model.

Example Clause T, the method of any one of Example Clause O through S, wherein the subset of datasets that caused the error are removed from the machine learning model.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for training a machine learning model to classify inputs comprising:
receiving an initial dataset from a trusted source, the initial dataset comprising a first plurality of inputs, wherein an individual input of the first plurality of inputs includes a natural language input and a known label;
training the machine learning model to classify each of the first plurality of inputs based on the natural language input and the known label;
generating an augmented dataset by modifying one or more natural language inputs included in one or more of the first plurality of inputs of the initial dataset to include a known adversarial trigger;
generating a robust machine learning model by training the machine learning model to identify one or more types of adversarial triggers utilizing the augmented dataset including the known adversarial trigger;
receiving an untrusted dataset from an external source, the untrusted dataset comprising a second plurality of inputs, wherein one or more individual inputs of the second plurality of inputs comprises a compromised natural language input including an adversarial trigger; and
retraining the robust machine learning model using the untrusted dataset and the augmented dataset to generate an updated robust machine learning model for detecting a subsequent compromised natural language input.

2. The method of claim 1, further comprising:
detecting, using the updated robust machine learning model, a compromised input comprising a compromised natural language input and a compromised label;
in response to detecting the compromised input, generating robust outputs to produce a corrected label associated with the compromised natural language input of the compromised input; and
removing the compromised label from the compromised input.

3. The method of claim 1, wherein detecting the subsequent compromised natural language input comprises:
providing an untrusted input to the robust machine learning model;
processing the untrusted input using the robust machine learning model to generate a label associated with a natural language input included in the untrusted input;
comparing the label associated with the natural language input to an untrusted label included in the untrusted input;
detecting a mismatch between the label and the untrusted label; and
generating an alert indicating the untrusted input as a compromised input in response to detecting the mismatch.

4. The method of claim 1, wherein retraining the robust machine learning model further comprises:
providing the untrusted dataset to a backdoor classifier;
detecting one or more unknown attack types associated with one or more compromised inputs within the untrusted dataset using the backdoor classifier, wherein the one or more compromised inputs comprises the compromised natural language input including an adversarial trigger; and
in response to detecting the one or more unknown attack types, removing the compromised inputs from the untrusted dataset to prevent a compromise of the robust machine learning model.

5. The method of claim 1, wherein an output of the robust machine learning model causes an activation of one or more security mechanisms in response to detecting a compromised input.

6. The method of claim 1, wherein the second plurality of inputs of the untrusted dataset comprises a plurality of untrusted inputs comprising an unknown natural language input and an untrusted label.

7. The method of claim 1 wherein:
training the machine learning model to classify the first plurality of inputs comprises a first training phase;
generating the robust machine learning model comprises a second training phase; and retraining the robust machine learning model comprises a third training phase.

8. A system for training a machine learning model to classify inputs comprising:
one or more processing units; and
a computer-readable memory having encoded thereon computer-readable instructions that when executed by the one or more processing units, causes the system to:
receive an initial dataset from a trusted source, the initial dataset comprising a first plurality of inputs, wherein an individual input of the first plurality of inputs includes a natural language input and a known label;
train the machine learning model to classify each of the first plurality of inputs based on the natural language input and the known label;
generate an augmented dataset by modifying one or more natural language inputs included in one or more of the first plurality of inputs of the initial dataset to include a known adversarial trigger;
generate a robust machine learning model by training the machine learning model to identify one or more types of adversarial triggers utilizing the augmented dataset including the known adversarial trigger;
receive an untrusted dataset from an external source, the untrusted dataset comprising a second plurality of inputs wherein one or more individual inputs of the second plurality of inputs comprises a compromised natural language input including an adversarial trigger; and
retrain the robust machine learning model using the untrusted dataset and the augmented dataset to generate an updated robust machine learning model for detecting a subsequent compromised natural language input.

9. The system of claim 8, wherein the computer-readable instructions further cause the system to:
detect, using the updated robust machine learning model, a compromised input comprising a compromised natural language input and a compromised label;
in response to detecting the compromised input, generate robust outputs to produce a corrected label associated with the compromised natural language input of the compromised input; and
remove the compromised label from the compromised input.

10. The system of claim 8, wherein the computer-readable instructions further cause the system to:
provide an untrusted input to the robust machine learning model;
process the untrusted input using the robust machine learning model to generate a label associated with a natural language input included in the untrusted input;
compare the label associated with the natural language input to an untrusted label included in the untrusted input;
detect a mismatch between the label and the untrusted label; and
generate an alert indicating the untrusted input as a compromised input in response to detecting the mismatch.

11. The system of claim 8, wherein the computer-readable instructions further cause the system to:
provide the untrusted dataset to a backdoor classifier;
detect one or more unknown attack types associated with one or more compromised inputs within the untrusted dataset using the backdoor classifier, wherein the one or more compromised inputs comprises the compromised natural language input including an adversarial trigger; and
in response to detecting the one or more unknown attack types, remove the compromised inputs from the untrusted dataset to prevent a compromise of the robust machine learning model.

12. The system of claim 8, wherein an output of the robust machine learning model causes an activation of one or more security mechanisms in response to detecting a compromised input.

13. The system of claim 8, wherein the subsequent compromised natural language input comprises one or more of a syntactic paraphrase, a synonym replacement, or a token trigger.

14. The system of claim 8, wherein the second plurality of inputs of the untrusted dataset comprises a plurality of untrusted inputs comprising an unknown natural language input and an untrusted label.

15. A method comprising:
receiving an initial dataset from a trusted source, the initial dataset comprising a first plurality of inputs, wherein an individual input of the first plurality of inputs includes a natural language input and a known label;
training the machine learning model to classify each of the first plurality of inputs based on the natural language input and the known label;
generating an augmented dataset by modifying one or more natural language inputs included in one or more of the first plurality of inputs of the initial dataset to include a known adversarial trigger;
generating a robust machine learning model by training the machine learning model to identify one or more types of adversarial triggers utilizing the augmented dataset including the known adversarial trigger;
receiving an untrusted dataset from an external source, the untrusted dataset comprising a second plurality of inputs wherein one or more individual inputs of the second plurality of inputs comprises a compromised natural language input including an adversarial trigger;
retraining the robust machine learning model using the untrusted dataset and the augmented dataset to generate an updated robust machine learning model for detecting a subsequent compromised natural language input;
detecting an error at an output of the robust machine learning model;
in response to detecting the error, providing a plurality of datasets that were used to train the robust machine learning model to a backdoor classifier comprising a first classifier and a second classifier;
determining, at the first classifier, a subset of the datasets that caused the error;
determining, at the second classifier, a type of compromise of the subset of the datasets that caused the error; and
generating an auditing output indicating the subset of datasets that caused the error and the type of compromise.

16. The method of claim 15, wherein the type of compromise comprises one or more of a syntactic paraphrase, a synonym replacement, or a token trigger.

17. The method of claim 15, wherein the first classifier is a binary classifier machine learning model.

18. The method of claim 15, wherein the second classifier is a multiclass classifier machine learning model.

19. The method of claim 15, wherein the auditing input causes an activation of one or more security measures in response to detecting the error at the output of the machine learning model.

20. The method of claim 15, wherein the subset of datasets that caused the error are removed from the machine learning model.

* * * * *